March 15, 1927. 1,620,633
C. H. COLVIN
PITOT STATIC TUBE
Filed April 16, 1924
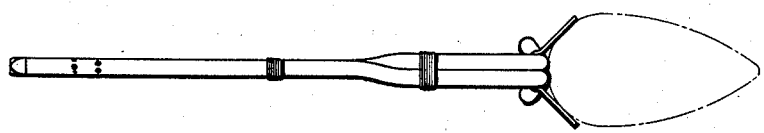
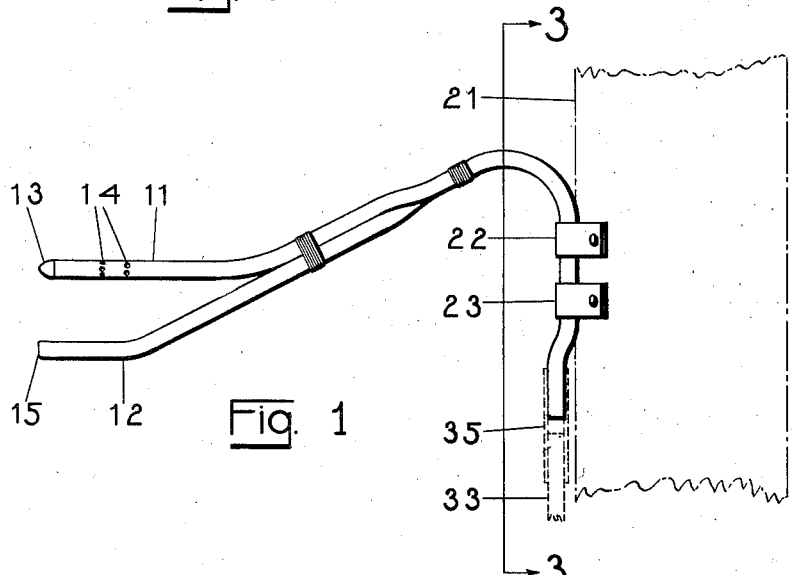
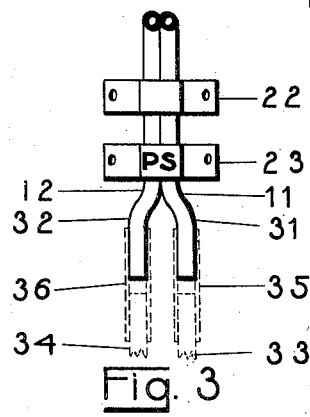
Charles H. Colvin
INVENTOR Patented Mar. 15, 1927.

1,620,633

UNITED STATES PATENT OFFICE.

CHARLES H. COLVIN, OF BROOKLYN, NEW YORK, ASSIGNOR TO PIONEER INSTRUMENT COMPANY, A COPARTNERSHIP CONSISTING OF CHARLES H. COLVIN, BRICE H. GOLDSBOROUGH, AND MORRIS M. TITTERINGTON, OF BROOKLYN, NEW YORK.

PITOT-STATIC TUBE.

Application filed April 16, 1924. Serial No. 706,990.

This invention relates to Pitot-static tubes such as may be used for the determination of the velocity of fluids, and particularly to such tubes as may be used on aircraft.

An object of this invention is to provide a Pitot-static tube which may be easily and accurately reproduced. A further object is to provide such a tube of minimum weight and low resistance to passage through fluid. Still further objects are to provide a tube wherein the angle between the mounting parts and the velocity responsive parts may be easily altered, and to provide a tube which may be self-draining. Other objects and advantages will appear as the invention is disclosed and explained.

While I show in my drawings what I now consider a preferred form of my device it will be understood that certain modifications may be resorted to, within the scope of this invention.

Referring now to the drawings, Figure 1 is an elevation, in which a part of the aircraft, to which my tube may be attached, is shown in dot-dash lines, and in which the connections for communication to a differential pressure gauge are shown in dotted line.

Figure 2 is a top or plan view of my tube, and

Figure 3 is a view on the section line 3—3 of Figure 1.

The Pitot-static tube comprises two tubes, 11 and 12, substantially parallel to each other but varied in their relative spacing as will now be described. The tubes are preferably made of soft material, or certain portions of them may be made soft by annealing.

At its forward end 13 the static tube 11 is closed and tapered to a point substantially as shown on the drawings. Spaced back from the end are two rows of small holes 14 communicating to the interior of the tube.

The forward end 15 of the Pitot tube 12 is open and the edge of the tube is slightly rounded, as shown on the drawings. For some distance back from their forward ends the Pitot and static tubes are parallel and spaced apart. The lower (Pitot) tube 12 is then bent upwardly at an angle, and at some distance rearward of this bend the static tube 11 is also bent upwardly, so that both tubes lie adjacent to each other for most of their inclined portion.

Near the top of the inclined portion the tubes are twisted about the common element of their cylindrical outer walls, so that they now lie side by side instead of one above the other. Both tubes next bend together on substantially the same radius and become approximately vertical. In this bent portion, at least, the tubes are made soft, for reasons which will later be apparent. The vertical part of the tubes is designed to lie along the forward edge of a strut 21 or other portion of an aircraft, as represented in the drawings. Around the tubes in their vertical portion are attached one or more mounting strips 22 and 23, for securing the tubes to the strut. These may be drilled to receive screws or may be held to the strut with tape. Below the mounting pieces the tubes 11 and 12 are spread apart and also bent out from the strut to form connecting ends 31 and 32. To these ends may be connected tubes 33 and 34 by means of short flexible rubber sleeves 35 and 36. Tubes 33 and 34 are for connecting to an indicating gauge, such as a differential gauge (not shown).

On one of the mounting strips may be marked the letters P and S, as shown in Figure 3, or other suitable marks, to distinguish the Pitot tube from the static tube.

As will be apparent to those versed in the art, the Pitot-static tube herein disclosed is extremely simple and inexpensive to manufacture. For use on aircraft its light weight and low head resistance are important advantages. By inclining the tubes upward from the open ends, they are made self-draining, for any water which may enter the tubes in flight (due to rain, spray, etc.) tends to drain out.

By bringing the tubes parallel and at the same radius at the upper bend, and by making this portion (at least) soft, the angular adjustment of the tube is greatly facilitated. For example, if the strut 21 is normally inclined to the vertical, this would naturally throw the forward ends of the tube out of the horizontal. To correct this, however, it is only necessary to bend both tubes together at the upper bend, causing their forward ends to make the desired angle with the strut.

Having disclosed and described my invention, what I claim as new, and desire to protect by Letters Patent, is:

1. A Pitot-static tube, comprising in combination, two tubes which throughout a part of their length are straight, parallel and spaced apart, and which throughout a second part of their length are adjacent and each bent upon substantially the same radius, and which throughout a third part of their length are straight, parallel and adjacent, said tubes being soft throughout said second part and said third part being at an angle to said first part, and said second part forming an angularly adjustable connection between said first part and said third part.

2. A Pitot-static tube, comprising in combination, two tubes which throughout a part of their length are straight, parallel and spaced apart, and which throughout a second part of their length are straight, parallel and adjacent, and which throughout a third part of their length are adjacent and each bent upon substantially the same radius, and which throughout a fourth part of their length are straight, parallel and adjacent, and which throughout a fifth part of their length are straight, parallel and spaced apart, said first and second parts being at an angle to each other, said tubes being soft throughout said third part, said fourth part being at an angle to both said first part and said second part, said second, third and fourth parts forming a connection between said first and fifth parts and said third part forming an angularly adjustable connection between said second part and said fourth part.

3. A device adapted to be attached to an aircraft for creating a differential pressure in accordance with the air speed of the aircraft and comprising in combination, a Pitot tube directed toward the direction in which the aircraft is normally headed, said Pitot tube extending upwardly from its forward air-admitting portion and then downwardly; a static tube which extends, begining at its forward end, first parallel and in the same vertical plane with said Pitot tube, then adjacent and in the same vertical plane with said Pitot tube, then in horizantal juxtaposition with respect to said Pitot tube at the upper and downwardly extending portions of the latter; means securing said tubes to each other, and means for attaching the rear, downwardly extending portions of said tubes to a strut of an aircraft, said tubes, at least at their upper bend, being of flexible construction whereby adjustment of the forward ends with respect to the rear, downwardly extending portions may be effected.

4. A Pitot-static tube instrument construction made of tubing, said instrument characterized among other things by having a first portion thereof rigid to resist a bending adjustment strain acting on a second portion of the instrument which is soft and susceptible of being bent and which yields to said strain, comprising vertically spaced fluid receiving horizontal tube ends, said tube ends being bent together and anchored one above the other in a vertical plane to form a rigid stiff section extending upwardly at an angle to the aforesaid horizontal ends and constituting the aforesaid strain resisting first portion, a twist made in the tubes thereby bringing said strain resisting first portion around to a new position side by side in a horizontal plane, a curve imparted to the side by side horizontally disposed tubes and said curved portion constituting the aforesaid second portion which yields to said strain, and fluid discharge stationary ends made on the tubes below the curved portion.

Signed at Brooklyn in the county of Kings and State of New York this 15th day of April A. D. 1924.

CHARLES H. COLVIN.